Dec. 9, 1952  B. MESSING  2,621,138
METHOD OF FORMING LAMINATED QUILTED MATERIAL
Filed Feb. 21, 1950
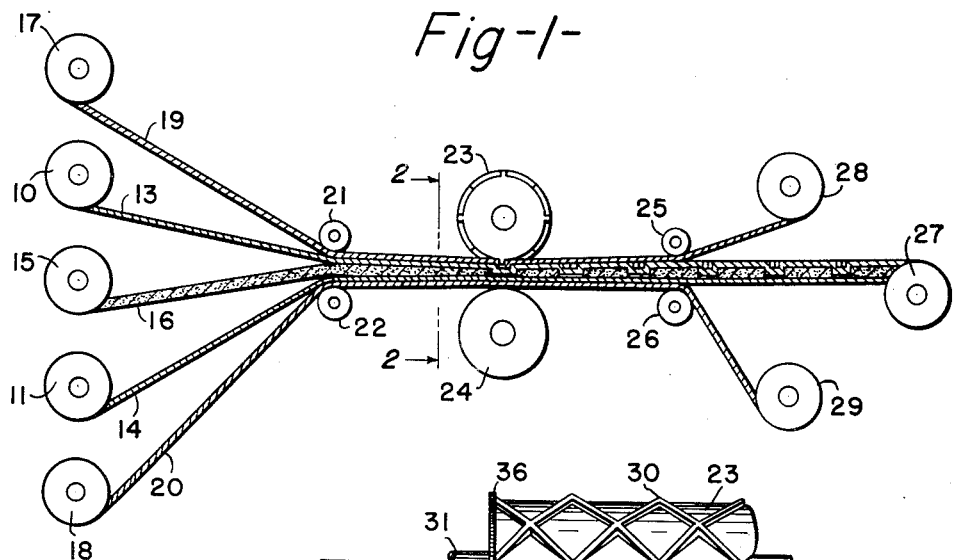
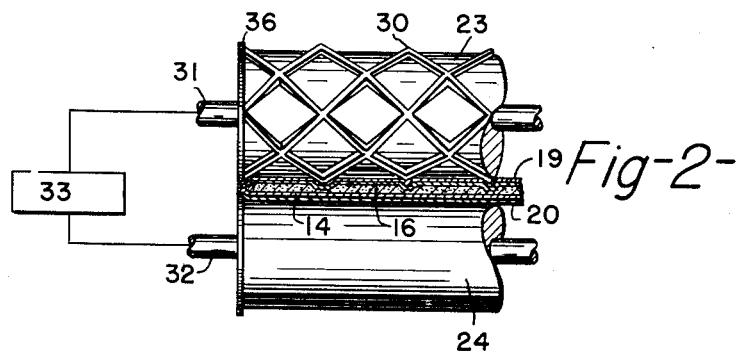
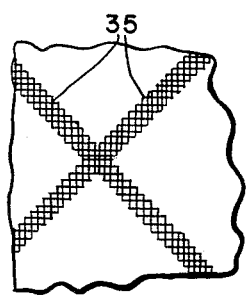
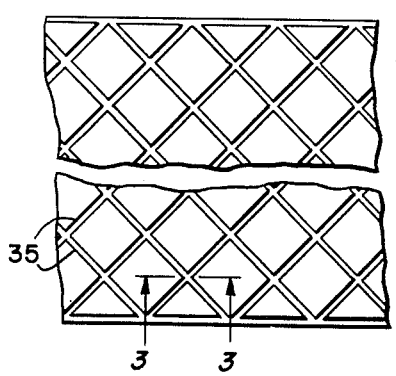
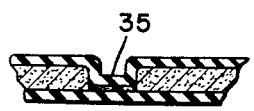
INVENTOR.
BENJAMIN MESSING
BY
*Luther W. Hawley*
ATTORNEY Patented Dec. 9, 1952

2,621,138

UNITED STATES PATENT OFFICE 2,621,138

METHOD OF FORMING LAMINATED QUILTED MATERIAL

Benjamin Messing, Hoboken, N. J.

Application February 21, 1950, Serial No. 145,505

2 Claims. (Cl. 154—106)

This invention relates to a method of laminating flexible sheet material, such as sheets of plastic material.

In the particular embodiment of the invention hereinafter described, the laminated material comprises outer sheets of thermoplastic material and an intermediate layer of suitable padding or wadding. In order to maintain the shape and condition of the padding between the sheets and outer covers, it is secured at spaced intervals by fusing the outer sheets through the intermediate layer of padding material. This is done by welding or bonding the plastic sheets through the intermediate layer, which is accomplished by positioning the material between electrodes and exerting pressure on the material and passing a current of electricity through the sheets and intermediate layers. This process is described in my copending application Serial No. 768,238, filed August 12, 1947.

In carrying out the process, there is a tendency for the electrodes to arc and for the plastic material to be burned or scorched.

This invention has for its salient object to provide a method of and apparatus for laminating plastic material by fusing the material of the laminations, so worked out that the electrodes used in fusing the plastic sheets will not arc and the material will not be scorched or burned.

Another object of the invention is to provide a novel method of and apparatus for forming designs on compressed portions of the laminated sheets.

Another object of the invention is to provide a novel method of and apparatus for laminating plastic sheets by fusing the sheets at spaced intervals through a layer of padding, the method being so carried out that heat is dissipated during the operation of the process.

Further objects of the invention will appear from the following specification taken in connection with the drawings which form a part of this application, and in which:

Fig. 1 is a diagrammatic elevational view illustrating one form of apparatus for carrying out the method of laminating the material;

Fig. 2 is an elevatinal view, on an enlarged scale, partly in section, illustrating the rolls for applying heat and pressure, this view being taken substantially on line 2—2 of Fig. 1, looking in the direction of the arrows;

Fig. 3 is a sectional elevation taken substantially on line 3—3 of Fig. 4, looking in the direction of the arrows;

Fig. 4 is a plan view, partly broken away, illustrating the completed material; and Fig. 5 is an enlarged fragmentary plan view of the material showing the designs produced on the material at the compressed and united portions thereof.

In the particular embodiment of the invention illustrated in the drawings, the apparatus illustrated in Fig. 1 comprises supply rolls 10 and 11 having sheets or webs 13 and 14 of suitable thermoplastic material, such as vinyl, polystryene, polyethylene or cellulose acetate sheeting. Between the supply rolls 10 and 11 there is mounted a supply roll 15 of a sheet or web 16 of suitable padding or wadding material, which may be formed of cotton, shoddy, wool, jute, or any desired fibrous material.

Outside of the supply rolls 10 and 11 respectively are mounted rolls 17 and 18 of webs or sheets of heat insulating or heat resistant, nonbonding spacing material, such as Fiberglas.

The sheets or webs 13 and 14, the intermediate layer or web 16 disposed therebetween, and the outer sheets or webs 19 and 20 are led from the supply rolls above mentioned between a pair of guiding or feeding rolls 21 and 22, and thence in superposed relation between a pair of heating and pressing rolls 23 and 24.

After the plastic sheets 13 and 14 have been fused under pressure through the intermediate layer 16 in the manner hereinafter described, the laminated, quilted material is led between a pair of delivery rolls 25 and 26 and is wound on a receiving roll 27.

In the form of the invention illustrated, the material is fused by passing a high frequency current therethrough at spaced intervals and by pressure applied at these intervals or at the points of fusing. One or both of the pressure rolls 23 and 24 may have any desired configuration of design formed on the peripheries thereof to impress this design on the material.

As shown, the roll 23 has ribs 30 which extend to the shaft 31. Roll 24 is not ribbed but is connected to shaft 32. There is shown at 33, diagrammatically, suitable apparatus for producing high frequency currents, which are conducted to the shafts 31 and 32 and thence through ribs 30, through the insulating sheets 19 and 20, and through sheets 13 and 14 and the intermediate layer 16 which is compressed by the rolls 23 and 24. This high frequency current generates heat in the sheets 13 and 14 and fuses the sheets at spaced intervals through the layer 16 of wadding. This intermediate layer thereby becomes imbedded in the sheets of thermoplastic material and these sheets are securely fused or bonded by the heat and pressure applied through the rolls 23 and 24. The outer edges of the sheets are also compressed and fused by ribs 36 which conduct the high frequency current and compress the material in the manner hereinbefore described.

The electrodes formed by rolls 23 and 24 normally tend to arc and burn the sheets 13 and 14 but this tendency is overcome by providing the outer insulating sheets 19 and 20 between the rolls 23 and 24 and the sheets 13 and 14. Moreover, the sheets 19 and 20 act to carry away the heat and prevent overheating of the sheets 13 and 14.

As shown in Fig. 5, the weave or pattern of the sheets 19 and 20 is impressed on the parts 35 of the sheets 13 and 14 where the sheets are fused.

Thus, in the manner hereinbefore described, arcing of the electrodes and scorching and overheating of the plastic sheets are effectively prevented. Moreover, the connected or fused portions can be given an attractive and ornamental appearance.

Although one specific embodiment of the invention has been particularly shown and described, it will be understood that the invention is capable of further modification and no limitations are intended other than those imposed by the following claims.

What I claim is:

1. A method of forming quilted, laminated thermoplastic material which consists of superposing two sheets of thermoplastic material with a layer of padding therebetween, disposing a sheet of heat insulating, non-fusible non-bonding spacing material outside each sheet of thermoplastic material, leading said superposed sheets between two electrodes connected to a source of high frequency current, applying pressure at spaced intervals to said superposed sheets through said electrodes, thereby bonding the first named sheets through the padding, and thereafter leading the outer sheets of heat insulating material away from the outer surfaces of the thermoplastic sheets.

2. A method of forming laminated, quilted material which consists of superposing two sheets of material with a layer of padding therebetween, at least one of said sheets being of thermoplastic material, disposing a sheet of heat insulating, non-fusible fiber glass material outside of at least one of said first named sheets, leading said superposed sheets between two electrodes connected to a source of high frequency current, applying pressure at spaced intervals to said superposed sheets through said electrodes, thereby bonding the first named sheets through the padding, and thereafter leading the outer insulating material away from the outer surface of the plastic sheet engaged thereby.

BENJAMIN MESSING.

REFERENCES CITED

The following references are of record in the file of this patent:

UNITED STATES PATENTS

| Number | Name | Date |
|---|---|---|
| 166,262 | Corwin | Aug. 3, 1875 |
| 1,781,797 | Williams | Nov. 18, 1930 |
| 2,304,123 | Rowe | Dec. 8, 1942 |
| 2,404,191 | Quayle et al. | July 16, 1946 |
| 2,430,459 | Farrell et al. | Nov. 11, 1947 |
| 2,460,566 | Brown et al. | Feb. 1, 1949 |
| 2,473,251 | Hsu | June 14, 1949 |
| 2,550,006 | Dreyfus | Apr. 24, 1951 |